United States Patent
Watanabe

(10) Patent No.: US 12,027,665 B2
(45) Date of Patent: Jul. 2, 2024

(54) ALL SOLID STATE BATTERY

(71) Applicant: TOYOTA JIDOSHA KABUSHIKI KAISHA, Toyota (JP)

(72) Inventor: Hideaki Watanabe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 219 days.

(21) Appl. No.: 17/548,840

(22) Filed: Dec. 13, 2021

(65) Prior Publication Data

US 2022/0200046 A1 Jun. 23, 2022

(30) Foreign Application Priority Data

Dec. 22, 2020 (JP) ................... 2020-212334

(51) Int. Cl.
*H01M 10/0562* (2010.01)

(52) U.S. Cl.
CPC .. *H01M 10/0562* (2013.01); *H01M 2300/008* (2013.01)

(58) Field of Classification Search
CPC ....... H01M 10/0562; H01M 2300/008; H01M 4/131; H01M 4/134; H01M 4/386; H01M 4/485; H01M 10/05; H01M 2300/0071; H01M 4/366; H01M 4/505; H01M 4/62; H01M 10/052; H01M 2004/028
USPC ......................................................... 429/188
See application file for complete search history.

(56) References Cited

U.S. PATENT DOCUMENTS

| | | | |
|---|---|---|---|
| 2014/0287324 A1* | 9/2014 | Tsuchida | H01M 10/052 429/304 |
| 2018/0342736 A1* | 11/2018 | Matsushita | H01M 4/667 |
| 2019/0088995 A1 | 3/2019 | Asano et al. | |
| 2019/0372102 A1 | 12/2019 | Miki | |
| 2020/0044284 A1 | 2/2020 | Fujino et al. | |
| 2020/0328465 A1 | 10/2020 | Sakaida et al. | |
| 2020/0328467 A1* | 10/2020 | Sasaki | C01B 17/22 |
| 2020/0350623 A1 | 11/2020 | Sasaki et al. | |
| 2021/0359303 A1 | 11/2021 | Sakaida et al. | |

FOREIGN PATENT DOCUMENTS

| | | |
|---|---|---|
| JP | 2015-046234 A | 3/2015 |
| JP | 2019-207793 A | 12/2019 |
| JP | 2020-021674 A | 2/2020 |
| KR | 10-2020-0015384 A | 2/2020 |
| KR | 10-2020-0096823 A | 8/2020 |
| WO | 2018/025582 A1 | 2/2018 |

(Continued)

*Primary Examiner* — James M Erwin
*Assistant Examiner* — Kevin Nguyen
(74) *Attorney, Agent, or Firm* — Oliff PLC

(57) ABSTRACT

A main object of the present disclosure is to provide an all solid state battery capable of decreasing the heating value. The present disclosure achieves the object by providing an all solid state battery comprising a cathode layer, an anode layer, and a solid electrolyte layer formed between the cathode layer and the anode layer, and the cathode layer includes a complex cathode active material containing a spinel type active material, and a lithium oxide layer coating a surface of the spinel type active material; and a halide solid electrolyte containing an X element wherein X is a halogen, as a main component of an anion, and the anode layer includes a Si based anode active material.

3 Claims, 1 Drawing Sheet

(56) References Cited

FOREIGN PATENT DOCUMENTS

| WO | 2019/135323 A1 | 7/2019 |
| WO | 2019/146216 A1 | 8/2019 |
| WO | 2020/174868 A1 | 9/2020 |

\* cited by examiner

ALL SOLID STATE BATTERY

TECHNICAL FIELD

The present disclosure relates to an all solid state battery.

BACKGROUND ART

An all solid state battery is a battery including a solid electrolyte layer between a cathode and an anode, and has advantages in that it is easy to simplify a safety device as compared with a liquid battery including a liquid electrolyte containing flammable organic solvents.

For example, Patent Literature 1 discloses a sulfide all solid state battery using an active material wherein a spinel type active material is coated with a lithium niobate, as a cathode active material, and using a Si based anode active material as an anode active material. Patent Literature 2 discloses a solid electrolyte represented by $Li_{6-3z}Y_zX_6$ wherein $0<z<2$, and "x" is Br or Cl. Patent Literature 3 discloses a combination use of $Li_3YI_6$ and $Li_2S-P_2S_5$ in a solid electrolyte layer of a battery. Also, Patent Literature 4 discloses that a cathode layer and a solid electrolyte layer include $Li_3YBr_2Cl_2I_2$, and that an anode layer includes $Li_2S-P_2S_5$.

CITATION LIST

Patent Literatures

Patent Literature 1: Japanese Patent Application Laid-Open (JP-A) No. 2019-207793
Patent Literature 2: WO2018/025582
Patent Literature 3: WO2019/135323
Patent Literature 4: WO2019/146216

SUMMARY OF DISCLOSURE

Technical Problem

The capacity property of the Si based anode active material is preferable. On the other hand, the heating value of the Si based anode active material may be increased, for example, when it is reacted with an oxygen gas generated from a cathode active material. The present disclosure has been made in view of the above circumstances, and a main object of the present disclosure is to provide an all solid state battery capable of decreasing the heating value.

Solution to Problem

The present disclosure achieves the object by providing an all solid state battery comprising a cathode layer, an anode layer, and a solid electrolyte layer formed between the cathode layer and the anode layer, and the cathode layer includes a complex cathode active material containing a spinel type active material, and a lithium oxide layer coating a surface of the spinel type active material; and a halide solid electrolyte containing an X element wherein X is a halogen, as a main component of an anion, and the anode layer includes a Si based anode active material.

According to the present disclosure, since the cathode layer includes a complex cathode active material wherein the surface of a spinel type active material is coated with a lithium oxide layer, and a halide solid electrolyte, an all solid state battery capable of suppressing the increase of the heating value even when the Si based anode active material is used, may be obtained.

In the disclosure, the halide solid electrolyte may include a Li element, an M element wherein M is a metal other than Li, and the X element.

In the disclosure, the halide solid electrolyte may include Y as the M.

In the disclosure, the halide solid electrolyte may include at least one of Br and Cl as the X.

In the disclosure, a lithium oxide included in the lithium oxide layer may be at least one kind of $LiNbO_3$ and $Li_2WO_4$.

In the disclosure, a proportion of an average thickness of the lithium oxide layer to an average particle size ($D_{50}$) of the spinel type active material may be 0.05% or more and 5% or less.

In the disclosure, the anode layer and the solid electrolyte layer may include a sulfide solid electrolyte respectively.

Advantageous Effects of Disclosure

The present disclosure exhibits effects such that the increase of the heating value in an all solid state battery may be suppressed.

DESCRIPTION OF EMBODIMENTS

Figure 1:
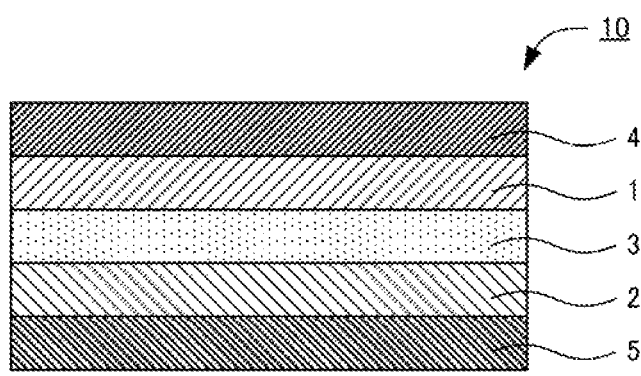
FIG. 1 is a schematic cross-sectional view illustrating an example of an all solid state battery in the present disclosure.
Figure 2:
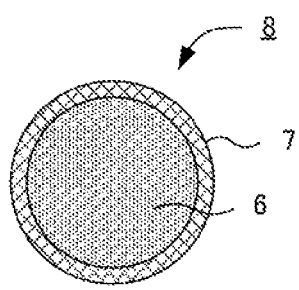
FIG. 2 is a schematic cross-sectional view illustrating an example of a complex cathode active material in the present disclosure.

The all solid state battery in the present disclosure will be hereinafter described in detail. FIG. 1 is a schematic cross-sectional view illustrating an example of an all solid state battery in the present disclosure. Also, FIG. 2 is a schematic cross-sectional view illustrating an example of a complex cathode active material in the present disclosure. All solid state battery 10 shown in FIG. 1 comprises cathode layer 1, anode layer 2, solid electrolyte layer 3 formed between cathode layer 1 and anode layer 2, cathode current collector 4 configure to collect current of cathode layer 1, and anode current collector 5 configured to collect current of anode layer 2. Cathode layer 1 includes a complex cathode active material and halide solid electrolyte. As shown in FIG. 2, complex cathode active material 8 contains spinel type active material 6 and lithium oxide layer 7 coating the surface thereof. Also, the halide solid electrolyte is a solid electrolyte containing an X element wherein X is a halogen, as a main component of an anion. Meanwhile, anode layer 2 includes a Si based anode active material.

According to the present disclosure, since the cathode layer includes a complex cathode active material wherein the surface of a spinel type active material is coated with a lithium oxide layer, and a halide solid electrolyte, an all solid state battery capable of suppressing the increase of the heating value even when the Si based anode active material is used, may be obtained.

As described above, the capacity property of the Si based anode active material is preferable. On the other hand, the heating value may be increased, when the Si based anode active material is reacted with an oxygen gas generated from a cathode active material. Particularly, it is believed that the reactivity to an oxygen of a lithium storing Si based anode active material is increased, and the reaction heat due to the reaction of O and Si is generated. Meanwhile, as shown in Examples described later, the present inventor has found out that the heating value in the cathode may be remarkably suppressed when the cathode layer includes a predetermined complex cathode active material and a halide solid electrolyte. The reason for this suppression is believed that the generated oxygen amount from the cathode active material is suppressed. The reason for this suppression is also believed that the reaction of the cathode active material and the solid electrolyte was suppressed by the lithium oxide layer. Although the reason why the generated oxygen amount is suppressed is not clear, it is believed that the crystal structure of the spinel type active material is stable so that an oxygen from the active material is not likely to be generated. Also, it is believed that the reactivity of the halide solid electrolyte with the oxygen is low so that the oxygen is not likely to be extracted from the cathode active material.

1. Cathode Layer

The cathode layer in the present disclosure includes at least a complex cathode active material and a halide solid electrolyte.

The complex cathode active material in the present disclosure contains a spinel type active material, and a lithium oxide layer coating a surface of the spinel type active material.

The spinel type active material is an active material including a crystal structure of a spinel type. Whether a subject has the crystal structure of the spine type or not may be determined by a conventionally known X-ray diffraction measurement (XRD). The spinel type active material preferably includes, for example, a Li element, and a Me element (Me is a transition metal of one kind or two kinds or more), and an O element. Examples of Me may include Mn, Ni, and Ti. The spinel type active material preferably includes at least Mn as Me. Also, the spinel type active material may include only Mn as Me; and may include Mn, and a transition metal other than Mn. In the latter case, the spinel type active material particularly preferably includes Mn and Ni as Me.

The spinel type active material preferably has a composition of, for example, $LiMe_2O_4$ (Me is a transition metal of one kind or two kinds or more). Me is similar to those described above. Specific examples of such spinel type active material may include $LiMn_2O_4$, and $Li(Ni_{0.5}Mn_{1.5})O_4$. Also, the spinel type active material may be a lithium titanate including Li, Ti, and O. Examples of the composition of the lithium titanate may include $Li_4Ti_5O_{12}$. Also, only one kind may be used, and two kinds or more may be used as the spinel type active material in the complex cathode active material.

Examples of the shape of the spinel type active material may include a granular shape. The average particle size ($D_{50}$) of the spinel type active material is, for example, 0.1 μm or more, may be 0.5 μm or more, and may be 1 μm or more. Meanwhile, the average particle size ($D_{50}$) of the spinel type active material is, for example, 50 μm or less, and may be 20 μm or less. The average particle size ($D_{50}$) of the spinel type active material may be calculated from the measurement by, for example, a laser diffraction particle size analyzer, and a scanning electron microscope (SEM).

The lithium oxide layer is a layer that coats at least a part of the surface of the spinel type active material, and includes a lithium oxide. The lithium oxide layer may function as a reaction inhibiting layer, and may suppress the generation of the reaction heat due to the reaction of the spinel type active material and the solid electrolyte. The lithium oxide layer is usually a layer having a Li ion conductivity.

The lithium oxide preferably includes, for example, a Li element, and a Me' element (Me' is a transition metal of one kind or two kinds or more), and an O element. Examples of Me' may include Nb and W. Specific examples of such lithium oxide may include $LiNbO_3$ and $Li_2WO_4$. Also the lithium oxide may include a Li element and a $PO_4$ structure. Specific examples of such lithium oxide may include $Li_3PO_4$. Also, the lithium oxide may be LiPON that is a nitride of $Li_3PO_4$. Also, the lithium oxide included in the lithium oxide layer may be only one kind, and may be two kinds or more.

The average thickness of the lithium oxide layer is, for example, 10 nm or more, may be 30 nm or more, and may be 50 nm or more. Meanwhile, the average thickness of the lithium oxide layer is, for example, 100 nm or less, may be 80 nm or less, and may be 60 nm or less. When the average thickness of the lithium oxide layer is too thin, the reaction between the spinel type active material and the solid electrolyte may not be sufficiently suppressed. Meanwhile, when the average thickness of the lithium oxide layer is too thick, the spinel type active material may not be sufficiently covered. The average thickness of the lithium oxide layer may be measured using, for example, a transmission electron microscope (TEM). Specifically, it may be determined by obtaining a cross-sectional SEM image of the complex cathode active material, measuring the thickness of arbitrary points, and calculating an average value.

The coverage by the lithium oxide layer is, for example, 70% or more, and may be 80% or more, and may be 90% or more. Meanwhile, the coverage may be 100%, and may be less than 100%. The coverage may be determined by X-ray photoelectron spectroscopy (XPS) measurement.

Here, in the complex cathode active material in the present disclosure, a proportion of an average thickness of the lithium oxide layer to an average particle size ($D_{50}$) of the spinel type active material is preferably in a predetermined range. The proportion is, for example, 0.05% or more, may be 0.07% or more, and may be 0.1% or more. Meanwhile, the proportion is, for example, 5% or less, may be 3% or less, may be 1% or less, and may be 0.5% or less. When the proportion is in the above range, since the reaction between the spinel type active material and the solid electrolyte may be sufficiently suppressed, the resistance increase of an all solid state battery may be suppressed.

Examples of the shape of the complex cathode active material may include a granular shape. The average particle size ($D_{50}$) of the complex cathode active material is, for example, 0.1 μm or more, may be 0.5 μm or more, and may be 1 μm or more. Meanwhile, the average particle size ($D_{50}$) of the complex cathode active material is, for example, 50 μm or less, and may be 20 μm or less. The average particle size of the complex cathode active material may be calculated from the measurement by, for example, a laser diffraction particle size analyzer, and a scanning electron microscope (SEM).

The cathode layer in the present disclosure includes a halide solid electrolyte. The halide solid electrolyte contains an X element wherein X is a halogen, as a main component of an anion. "Contains an X element as a main component of an anion" denotes that the proportion (molar ratio) of X element is the highest among all the anions constituting the halide solid electrolyte. The proportion of the X element to all the anions constituting the halide solid electrolyte is, for example, 50 mol % or more, may be 70 mol % or more, may be 90 mol % or more, and may be 100 mol %. The X element may be one kind, and may be two kinds or more. In the latter case, the total of two kinds or more of the X element is regarded as the "proportion of X element". Also, the halide solid electrolyte may be a solid electrolyte including no sulfur element (S element).

The halide solid electrolyte preferably includes a Li element, an M element wherein M is a metal other than Li, and the X element wherein X is a halogen. Examples of the X may include F, Cl, Br, and I. The halide solid electrolyte particularly preferably includes at least either one of Br and Cl as the X. Also, examples of M may include metal elements such as Sc, Y, B, Al, Ga, and In. The halide solid electrolyte in the present disclosure particularly preferably includes at least Y as the M.

Also, the composition of the halide solid electrolyte in the present disclosure is not particularly limited; and is preferably represented by $Li_{6-3a}M_aBr_bCl_c$, wherein M is a metal other than Li, "a" satisfies $0<a<2$, "b" satisfies $0 \leq b \leq 6$, "c" satisfies $0 \leq c \leq 6$, and "b" and "c" satisfy $b+c=6$. The "a" may be 0.75 or more, and may be 1 or more. Meanwhile, the "a" may be 1.5 or less. The "b" may be 1 or more, and may be 2 or more. Also, the "c" may be 3 or more, and may be 4 or more. Specific examples of the halide solid electrolyte may include $Li_3YBr_6$, $Li_3YCl_6$, and $Li_3YBr_2Cl_4$. The cathode layer may include only one kind of the halide solid electrolyte, and may include two kinds or more of the halide solid electrolyte.

Examples of the shape of the halide solid electrolyte may include a granular shape. The average particle size ($D_{50}$) of the halide solid electrolyte is not particularly limited; and is, for example, 0.05 μm or more, may be 0.1 μm or more. Meanwhile, the average particle size ($D_{50}$) of the halide solid electrolyte is, for example, 50 μm or less, and may be 20 μm or less. The average particle size ($D_{50}$) of the halide solid electrolyte may be calculated from the measurement by, for example, a laser diffraction particle size analyzer, and a scanning electron microscope (SEM).

The cathode layer may include only the halide solid electrolyte as the solid electrolyte, may include a solid electrolyte other than the halide solid electrolyte, and the former is preferable. In the latter case, the proportion of the halide solid electrolyte to all the solid electrolyte included in the cathode layer is, for example, 50 volume % or more, may be 70 volume % or more, and may be 90 volume % or more. Meanwhile, the proportion is, for example, 99 volume % or less. Example of the solid electrolyte other than the halide solid electrolyte may include the solid electrolyte to be described later in "2. Anode layer".

Also, the cathode layer may further include at least either one of a conductive material, and a binder, as necessary. Examples of the conductive material may include a carbon material, a metal particle, and a conductive polymer. Examples of the carbon material may include particulate carbon materials such as acetylene black (AB) and Ketjen black (KB); and fibrous carbon materials such as carbon fiber, carbon nanotube (CNT), and carbon nanofiber (CNF). Also, examples of the binder may include rubber based binders such as butylene rubber (BR); and fluoride based binders such as polyvinylidene fluoride (PVDF).

The thickness of the cathode layer is, for example, 0.1 μm or more and 1000 μm or less.

2. Anode Layer

The anode layer in the present disclosure includes at least a Si based anode active material. Also, the anode layer preferably includes a sulfide solid electrolyte. Further, the anode layer may further include at least either one of a conductive material, and a binder, as necessary. Since the conductive material and the binder are similar to those described in "1. Cathode layer" above, description thereof is omitted here.

The Si based anode active material is an active material including a Si element. Examples of the Si based anode active material may include a Si simple substance, and a Si alloy. The Si alloy preferably includes Si elements as a main component. Examples of the shape of the Si based anode active material may include a granular shape. The average particle size ($D_{50}$) of the Si based anode active material is, for example, 10 nm or more, and may be 100 nm or more. Meanwhile, the average particle size ($D_{50}$) of the Si based anode active material is, for example, 50 μm or less, and may be 20 μm or less. The average particle size ($D_{50}$) may be calculated from the measurement by, for example, a laser diffraction particle size analyzer, and a scanning electron microscope (SEM).

The proportion of the Si based anode active material in the anode layer is, for example, 20 volume % or more, may be 40 volume % or more, and may be 60 volume % or more. When the proportion of the Si based anode active material is too low, the volume energy density may not be improved. Meanwhile, the proportion of the Si based anode active material in the anode layer is, for example, 80 volume % or more. When the proportion of the Si based anode active material is too high, preferable electron conductive path and ion conductive path may not be formed.

The anode layer preferably includes a sulfide solid electrolyte. The anode layer may include only the sulfide solid electrolyte as the solid electrolyte, may include a solid electrolyte other than the sulfide solid electrolyte, and the former is preferable. In the latter case, the proportion of the sulfide solid electrolyte to all the solid electrolyte included in the anode layer is, for example, 50 volume % or more, may be 70 volume % or more, and may be 90 volume % or more. Meanwhile, the proportion is, for example, 99 volume % or less. Incidentally, the anode layer preferably include no halide solid electrolyte described above, as the anode solid electrolyte. Since the reduction resistance of the halide solid electrolyte is usually low, the halide solid electrolyte may be reductive decomposed during charge, so that the battery resistance may be increased.

Examples of the sulfide solid electrolyte may include a solid electrolyte containing a Li element, an X element (X is at least one kind of P, As, Sb, Si, Ge, Sn, B, Al, Ga, and In), and a S element. Also, the sulfide solid electrolyte may further include at least either one of an O element and a halogen element. Examples of the halogen element may include a F element, a Cl element, a Br element, and an I element. The sulfide solid electrolyte may be a glass (amorphous), and may be a glass ceramic. Examples of the sulfide solid electrolyte may include $Li_2S-P_2S_5$, $LiI-Li_2S-P_2S_5$, $LiI-LiBr-Li_2S-P_2S_5$, $Li_2S-SiS_2$, $Li_2S-GeS_2$, and $Li_2S-P_2S_5-GeS_2$.

Examples of the solid electrolyte other than the sulfide solid electrolyte may include inorganic solid electrolytes such as hydride solid electrolyte, oxide solid electrolyte, and nitride solid electrolyte.

Also, examples of the shape of the solid electrolyte may include a granular shape. The average particle size ($D_{50}$) of the solid electrolyte is not particularly limited; and is, for example, 0.05 μm or more, and may be 0.1 μm or more. Meanwhile, the average particle size ($D_{50}$) of the solid electrolyte is, for example, 50 μm or less, and may be 20 μm or less. The average particle size ($D_{50}$) of the solid electrolyte may be calculated from the measurement by, for example, a laser diffraction particle size analyzer, and a scanning electron microscope (SEM).

The thickness of the anode layer is, for example, 0.1 µm or more and 1000 µm or less.

3. Solid Electrolyte Layer

The solid electrolyte layer in the present disclosure is a layer formed between the cathode layer and the anode layer, and includes a solid electrolyte. Also, the solid electrolyte layer preferably includes a sulfide solid electrolyte as the solid electrolyte. Also, the solid electrolyte layer may or may not include a solid electrolyte other than the sulfide solid electrolyte. Incidentally, the solid electrolyte layer preferably include no halide solid electrolyte. This is because the halide solid electrolyte may be reductive decomposed at the interface to the anode layer during charge, so that the battery resistance may be increased. The kind and the proportion, for example, of the sulfide solid electrolyte and the solid electrolyte other than the sulfide solid electrolyte are similar to those described in "2. Anode layer" above, description thereof is omitted here.

Also, the solid electrolyte layer may include a binder as necessary. Since the binder is similar to those described in "1. Cathode layer" above, description thereof is omitted here. The thickness of the solid electrolyte layer is, for example, 0.1 µm or more and 1000 µm or less.

4. All Solid State Battery

The all solid state battery in the present disclosure usually comprises a cathode current collector configured to collect current of the cathode layer and an anode current collector configured to collect current of the anode layer. Examples of the cathode current collector may include an Al foil. Examples of the anode current collector may include a Ni foil. Also, the all solid state battery in the present disclosure may include a confining jig that applies a confining pressure along the thickness direction, to the cathode layer, the anode layer, and the solid electrolyte layer. The confining pressure is, for example, 0.1 MPa or more, may be 1 MPa or more, and may be 5 MPa or more. Meanwhile, the confining pressure is, for example, 100 MPa or less, may be 50 MPa or less, and may be 20 MPa or less.

The kind of the all solid state battery in the present disclosure is not particularly limited; and typically a lithium ion battery. Also, the all solid state battery in the present disclosure may be a primary battery and may be a secondary battery; above all, preferably the secondary battery so as to be repeatedly charged and discharged, and be useful as a car-mounted battery, for example.

The all solid state battery in the present disclosure may be a single cell battery and may be a stacked battery. The stacked battery may be a monopolar type stacked battery (a stacked battery connected in parallel), and may be a bipolar type stacked battery (a stacked battery connected in series). Examples of the shape of the all solid state battery may include a coin shape, a laminate shape, a cylindrical shape, and a square shape.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

Example 1

<Production of Complex Cathode Active Material>

Using a tumbling fluidized bed granulating-coating machine (MP-01 from Powrex Corp.), the surface of a cathode active material (spinel type lithium manganate: $LiMn_2O_4$) was coated with $LiNbO_3$ precursor sol-gel solution, and dried. After that, by burning thereof at 200° C. for 5 hours, a complex cathode active material including $LiNbO_3$ layer as a lithium oxide layer was obtained. The average particle size of the cathode active material was measured using a wet type nano particle size analyzer (SALD-7500, from Shimadzu Corporation). Also, the thickness of the lithium oxide layer was calculated as follows. Firstly, the obtained complex cathode active material was filled in a resin, a cross-section processing was carried out with an ion milling device (IM4000PLUS, from Hitachi High-Tech Corporation), and SEM observation was carried out. Then, the thickness of the lithium oxide layer was measured at arbitrary five points, and an average value was calculated.

<Production of Cathode>

A dispersing medium (butyl butyrate), a binder (a butyl butyrate solution containing a polyvinylidene fluoride based binder at the ratio of 5 weight %), a conductive material (a vapor-grown carbon fiber (VGCF)), and a halide solid electrolyte ($Li_3YBr_2Cl_4$) were added to a mixing container of a FILMIX device (30-L Type, from PRIMIX Corporation), stirred for 30 minutes at 20000 rpm. To the mixing container, the complex cathode active material was added so as the volume ratio of the complex cathode active material and the halide solid electrolyte was 7:3, and the mixing container was stirred for 60 minutes at 15000 rpm with the FILMIX device. Then, the obtained mixture was pasted on a cathode current collector (an Al foil) by a blade method using an applicator, the pasted electrode was dried naturally, and was dried for 30 minutes on a hot plate at 100° C. A cathode including a cathode current collector and a cathode layer was obtained in the above manner.

<Production of Anode>

A dispersing medium (butyl butyrate), a binder (a butyl butyrate solution containing a polyvinylidene fluoride based binder at the ratio of 5 weight %), an anode active material (silicon particles, average particle size $D_{50}$=2.5 µm), a conductive material (a vapor-grown carbon fiber (VGCF), and a sulfide solid electrolyte ($Li_2S$—$P_2S_5$ based glass ceramic including LiI, average particle size $D_{50}$=0.8 µm) were added to a polypropylene (PP) container. Then, the PP container was stirred for 30 seconds with an ultrasonic dispersion apparatus (UH-50, from SMT Corp.). Then, the PP container was shaken with a shaker (TTM-1, from Sibata Scientific Technology LTD.) for 30 minutes. Then, the obtained mixture was pasted on an anode current collector (a Ni foil) by a blade method using an applicator. The pasted electrode was dried naturally, and was dried for 30 minutes on a hot plate at 100° C. Thereby, an anode including an anode current collector and an anode layer was obtained.

<Production of Solid Electrolyte Layer>

A dispersing medium (heptane), a binder (a heptane solution containing a butylene rubber based binder at the ratio of 5 weight %), and a sulfide solid electrolyte ($Li_2S$—$P_2S_5$ based glass ceramic including LiI, average particle size $D_{50}$=2.5 µm) were added to a PP container. Then, the PP container was stirred for 30 seconds with an ultrasonic dispersion apparatus (UH-50, from SMT Corp.). Then, the PP container was shaken with a shaker (TTM-1, from Sibata Scientific Technology LTD.) for 30 minutes. Then, the obtained mixture was pasted on a substrate (an Al foil) by a blade method using an applicator. The pasted solid electrolyte layer was naturally dried, and was dried for 30 minutes on a hot plate at 100° C. Thereby, a solid electrolyte layer was obtained.

<Production of Evaluation Battery>

The solid electrolyte layer was placed in a metallic mold of 1 cm$^2$, and was pressed under 1 ton/cm$^2$. Then, the cathode was placed on one side of the solid electrolyte layer, and was pressed under 1 ton/cm$^2$. Then, the anode was placed on another side of the solid electrolyte layer, and was pressed under 6 ton/cm$^2$. An evaluation battery was produced by connecting a cathode terminal and an anode terminal to the stacked body obtained after pressing, sandwiching thereof between laminate films, and sealing. Then, the resultant was confined with metal plates so that a pressure of 5 MPa was applied to the battery.

Examples 2 to 4

A complex cathode active material was produced in the same manner as in Example 1 except that the proportion of the thickness of the lithium oxide layer to the average particle size of the spinel type active material was adjusted to be the value shown in Table 1. An evaluation battery was produced in the same manner as in Example 1 except that the obtained complex cathode active material was used.

Examples 5 and 6

An evaluation battery was produced in the same manner as in Example 1 except that $Li_2WO_4$ was used as the lithium oxide, and the proportion of the thickness of the lithium oxide layer to the average particle size of the spinel type active material was adjusted to be the value shown in Table 1.

Comparative Example 1

A complex cathode active material was produced in the same manner as in Example 1 except that lithium-nickel-cobalt-aluminum oxide ($LiNi_{0.82}Co_{0.15}Al_{0.03}O_2$) was used as the cathode active material; the solid electrolyte used for the cathode layer was changed to a sulfide solid electrolyte ($Li_2S$—$P_2S_5$ based glass ceramic including LiI, average particle size $D_{50}$=0.8 μm); and the proportion of the thickness of the lithium oxide layer to the average particle size of the cathode active material was adjusted to be the value shown in Table 1. An evaluation battery was produced in the same manner as in Example 1 except that the obtained complex cathode active material was used.

Comparative Example 2

A complex cathode active material was produced in the same manner as in Example 1 except that lithium-nickel-cobalt-aluminum oxide ($LiNi_{0.82}Co_{0.15}Al_{0.03}O_2$) was used as the cathode active material; and the proportion of the thickness of the lithium oxide layer to the average particle size of the cathode active material was adjusted to be the value shown in Table 1. An evaluation battery was produced in the same manner as in Example 1 except that the obtained complex cathode active material was used.

Comparative Example 3

A complex cathode active material and an evaluation battery were produced in the same manner as in Example 1 except that the solid electrolyte used for the cathode layer was changed to a sulfide solid electrolyte ($Li_2S$—$P_2S_5$ based glass ceramic including LiI, average particle size $D_{50}$=0.8 μm); and the proportion of the thickness of the lithium oxide layer to the average particle size of the cathode active material was adjusted to be the value shown in Table 1.

[Evaluation]

<Generated Oxygen Amount>

The generated oxygen amount of each produced evaluation battery was evaluated by calculating a cumulative heating value as follows. Firstly, in a glove box filled with an inert gas, the charged evaluation battery was disassembled to take out the cathode layer only, and processed into a predetermined size. Then, a differential scanning calorimetry (DSC) was carried out at 10° C./min, under He atmosphere. The cumulative heating value was calculated by dividing the integrated result of the heating value of 500° C. or less, by the cathode active material weight of the cathode layer. The results are shown in Table 1.

[Resistance Increasing Ratio]

A constant current-constant voltage charge/discharge of each of the produced evaluation battery was carried out at 1/3 C rate, and the capacity was checked. Then, SOC was adjusted to be 50% at 1/3 C rate. Then, an AC impedance measuring was carried out at applying voltage of 10 mV, measuring frequency band of 0.1 Hz to 106 Hz. A circular arc was fit to the obtained Cole-Cole plot, and the distance between two intersection points of the fit circular arc and a real axis was regarded as a reaction resistance (reaction resistance before preservation test). After measuring the reaction resistance, SOC was adjusted to 100%, and the evaluation battery was stored in a thermostatic chamber maintained at 60° C., for 30 days. Then, SOC was adjusted once again to 50%, the reaction resistance (reaction resistance after preservation test) was measured similarly, and the resistance variation before and after the preservation test was regarded as a resistance increasing ratio. The results are shown in Table 1.

TABLE 1

| | Cathode active material | Solid electrolyte | Resistance suppressing layer | Thickness ratio (%) | Heating value (J/g) | Resistance increasing ratio (%) |
|---|---|---|---|---|---|---|
| Comp. Ex. 1 | $LiNi_{0.82}Co_{0.15}Al_{0.03}O_2$ | LiI—$Li_2S$—$P_2S_5$ | $LiNbO_3$ | 0.5 | 1306 | 145 |
| Comp. Ex. 2 | $LiNi_{0.82}Co_{0.15}Al_{0.03}O_2$ | $Li_3YBr_2Cl_4$ | $LiNbO_3$ | 0.8 | 525 | 133 |
| Comp. Ex. 3 | $LiMn_2O_4$ | LiI—$Li_2S$—$P_2S_5$ | $LiNbO_3$ | 1.0 | 362 | 136 |
| Example 1 | $LiMn_2O_4$ | $Li_3YBr_2Cl_4$ | $LiNbO_3$ | 0.01 | 311 | 158 |
| Example 2 | $LiMn_2O_4$ | $Li_3YBr_2Cl_4$ | $LiNbO_3$ | 20 | 107 | 131 |
| Example 3 | $LiMn_2O_4$ | $Li_3YBr_2Cl_4$ | $LiNbO_3$ | 0.05 | 98 | 105 |
| Example 4 | $LiMn_2O_4$ | $Li_3YBr_2Cl_4$ | $LiNbO_3$ | 5.0 | 64 | 108 |
| Example 5 | $LiMn_2O_4$ | $Li_3YBr_2Cl_4$ | $Li_2WO_4$ | 0.07 | 87 | 109 |
| Example 6 | $LiMn_2O_4$ | $Li_3YBr_2Cl_4$ | $Li_2WO_4$ | 3.0 | 50 | 110 |

As shown in Table. 1, the heating value (generated oxygen amount) of the cathode was low in each of Examples 1 to 6. Meanwhile, although the heating value of the cathode was decreased when the cathode layer included either one of the complex cathode active material (complex cathode active material wherein the surface of a spinel type active material is coated with a lithium oxide layer) and the halide solid electrolyte, the results in Comparative Examples 1 to 3 were higher than Examples 1 to 6. Therefore, it was confirmed that the heating value may be remarkably decreased by combining a predetermined complex cathode active material and halide solid electrolyte, as in the present disclosure. Also, from Examples 3 to 6, it was confirmed that the heating value may further be decreased and the resistance increasing ratio may also be suppressed, when the proportion of the average thickness of the lithium oxide layer to the average particle size ($D_{50}$) of the spinel type active material was in a predetermined range.

Here, the followings are believed to be the reasons why the heating value of the cathode was low in Examples 1 to 6: the reaction between the cathode active material and the solid electrolyte was suppressed by the lithium oxide layer; the crystal structure of the spinel type active material was stable; and the reactivity of the halide solid electrolyte with oxygen was low. Incidentally, the lithium-nickel-cobalt-aluminum oxide (rock salt bed type active material) used in Comparative Examples 1 and 2 is believed to be an active material that easily discharges oxygen. Also, in Comparative Example 3, it is believed that Mn in the cathode active material and S in the sulfide solid electrolyte were reacted at the part not coated with $LiNbO_3$ so that the heating value was increased.

REFERENCE SIGNS LIST

1 . . . cathode layer
2 . . . anode layer
3 . . . solid electrolyte layer
4 . . . cathode current collector
5 . . . anode current collector
6 . . . spinel type active material
7 . . . lithium oxide layer
8 . . . complex cathode active material
10 . . . all solid state battery

What is claimed is:

1. An all solid state battery comprising a cathode layer, an anode layer, and a solid electrolyte layer formed between the cathode layer and the anode layer, and
    the cathode layer includes
        a complex cathode active material containing a spinel type active material, and a lithium oxide layer coating a surface of the spinel type active material; and
        a halide solid electrolyte containing an X element wherein X is a halogen, as a main component of an anion, and
    the anode layer includes a Si based anode active material,
    the spinel type active material has a composition of $LiMe_2O_4$, wherein "Me" is Mn or a combination of Mn and Ni,
    a lithium oxide included in the lithium oxide layer is at least one of $LiNbO_3$ and $Li_2WO_4$,
    the halide solid electrolyte has a composition of $Li_3YBr_bCl_c$, wherein "b" satisfies $0 \leq b \leq 6$, "c" satisfies $0 \leq c \leq 6$, and "b" and "c" satisfy b+c=6, and
    a ratio of an average thickness of the lithium oxide layer to an average particle size ($D_{50}$) of the spinel type active material is 3.0% or more and 5.0% or less.

2. The all solid state battery according to claim 1, wherein both of the anode layer and the solid electrolyte layer include a sulfide solid electrolyte.

3. The all solid state battery according to claim 1, wherein the spinel type active material is $LiMn_2O_4$, and the halide solid electrolyte is $Li_3YBr_2Cl_4$.

* * * * *